United States Patent
Miyazaki (10) Patent No.: US 11,086,587 B2
(45) Date of Patent: Aug. 10, 2021

(54) SOUND OUTPUTTING APPARATUS AND METHOD FOR HEAD-MOUNTED DISPLAY TO ENHANCE REALISTIC FEELING OF AUGMENTED OR MIXED REALITY SPACE

(71) Applicant: SONY INTERACTIVE ENTERTAINMENT INC., Tokyo (JP)

(72) Inventor: Yoshio Miyazaki, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 46 days.

(21) Appl. No.: 16/472,560

(22) PCT Filed: Dec. 28, 2017

(86) PCT No.: PCT/JP2017/047225
§ 371 (c)(1),
(2) Date: Jun. 21, 2019

(87) PCT Pub. No.: WO2018/128161
PCT Pub. Date: Jul. 12, 2018

(65) Prior Publication Data
US 2019/0324708 A1 Oct. 24, 2019

(30) Foreign Application Priority Data
Jan. 6, 2017 (JP) .............................. JP2017-001267

(51) Int. Cl.
*G06F 3/16* (2006.01)
*G02B 27/01* (2006.01)
*G06F 3/00* (2006.01)
*G06F 3/01* (2006.01)
*G06T 19/00* (2011.01)

(52) U.S. Cl.
CPC ............. *G06F 3/16* (2013.01); *G02B 27/017* (2013.01); *G06F 3/005* (2013.01); *G06F 3/011* (2013.01);
(Continued)

(58) Field of Classification Search
CPC .. G02B 27/01; G02B 27/017; G02B 27/0172; G02B 27/0174; G02B 27/0178;
(Continued)

(56) References Cited

U.S. PATENT DOCUMENTS 10,516,959 B1* 12/2019 Mindlin .................. H04S 7/304
10,691,405 B2* 6/2020 Miyazaki ................ G06F 3/011
(Continued)

FOREIGN PATENT DOCUMENTS

| JP | 10-153946 A | 6/1998 |
|----|-------------|--------|
| JP | 2016-033764 A | 3/2016 |
| JP | 2016-208348 A | 12/2016 |

OTHER PUBLICATIONS

International Preliminary Report on Patentability dated Jul. 9, 2019, from International Application No. PCT/JP2017/047225, 6 sheets.
(Continued)

*Primary Examiner* — Vijay Shankar
*Assistant Examiner* — Nelson Lam
(74) *Attorney, Agent, or Firm* — Katten Muchin Rosenman LLP (57) ABSTRACT

The present invention provides a sound outputting apparatus, a head-mounted display, a sound outputting method, and a program each of which enables realistic feeling of an augmented reality space or a mixed reality space to be enhanced. An AR space video image generating section (116) generates an image, of an augmented reality space or a mixed reality space to be displayed on a display section of a head-mounted display, including a part which an image of a virtual reality space occupies, and a part which an image of a real space obtained through photographing by a camera photographing a circumference of a user occupies. A synthetic sound generating section (108) synthesizes a sound of the virtual reality space, and a sound of a real space of the
(Continued)

circumference of the user with each other to generate a synthetic sound. A synthetic sound transmitting section (110) outputs the synthetic sound sounded from a speaker arranged in the vicinity of an ear of the user.

4 Claims, 7 Drawing Sheets

(52) U.S. Cl.
    CPC ...... *G06T 19/006* (2013.01); *G02B 2027/014* (2013.01)

(58) Field of Classification Search
    CPC . G06F 3/005; G06F 3/01; G06F 3/011; G06F 3/012; G06F 3/013; G06F 3/16
    USPC .......................................................... 345/7–9
    See application file for complete search history.

(56)            References Cited

U.S. PATENT DOCUMENTS

2009/0219224 A1* 9/2009 Elg ........................ G06F 3/012
                                                        345/8
2009/0278917 A1* 11/2009 Dobbins ................. G06F 3/011
                                                       348/53
2010/0103075 A1* 4/2010 Kalaboukis ......... G06F 3/04815
                                                        345/8
2013/0328925 A1* 12/2013 Latta ...................... G09G 3/003
                                                       345/633
2014/0372944 A1* 12/2014 Mulcahy ................. G06F 3/012
                                                       715/810
2015/0077416 A1* 3/2015 Villmer ................... G06T 11/60
                                                       345/419
2016/0034251 A1   2/2016 Sendai et al.
2016/0300387 A1* 10/2016 Ziman ..................... G06F 3/147
2016/0313973 A1  10/2016 Yajima
2017/0277257 A1* 9/2017 Ota ........................ G06F 1/163
2017/0285742 A1* 10/2017 Marggraff .............. G06F 3/013
2019/0176027 A1* 6/2019 Smith ....................... G06T 7/60
2021/0084429 A1* 3/2021 Tajik ....................... H04R 3/12

OTHER PUBLICATIONS

International Search Report and Written Opinion dated Feb. 13, 2018, from International Application No. PCT/JP2017/047225, 9 sheets.

* cited by examiner

SOUND OUTPUTTING APPARATUS AND METHOD FOR HEAD-MOUNTED DISPLAY TO ENHANCE REALISTIC FEELING OF AUGMENTED OR MIXED REALITY SPACE

TECHNICAL FIELD

The present invention relates to a sound outputting apparatus, a head-mounted display, a sound outputting method, and a program.

BACKGROUND ART

There is known a technology for displaying a video image of an augmented reality space constituting an image including a part which an image of a virtual reality space occupies, and a part which an image of a real space obtained through photographing by a camera which photographs a circumference of a user occupies. In addition, in the recent years, a technology of mixed reality (MR) in which information associated with a real space is retrieved in a virtual space produced by using computer graphics, and the real space and the virtual reality space are merged with each other has begun to attract attention. In the mixed reality space in which the real space and the virtual reality space are merged with each other, the interaction between an environment of a virtual object arranged in the virtual reality space or the virtual reality space, and an environment of an object arranged in the real space or the real space becomes more important.

SUMMARY

Technical Problem

The inventors examine that such a video image of an augmented reality space or a mixed reality space is caused to be displayed on a head-mounted display (HMD) which can be mounted to a head of a user so as to appreciate a video image displayed in front of the eyes of the user, thereby causing the user to experience the scene as if he/she lies in the augmented reality space or the mixed reality space.

In general, the user equipped with the HMD is adapted to hear the sound of the virtual reality space such as a background music (BGM), a sound effect, or a voice of a virtual object such as a character arranged in the virtual reality space from a speaker, such as an earphone or a headphone, arranged in the vicinity of the ear of the user.

In this case, however, since the sound of the real space of circumference of the user was intercepted by the sound sounded from the speaker described above, the realistic feeling of the augmented reality space or the mixed reality space was impeded.

It is one of objects of the present invention to provide a sound outputting apparatus, a head-mounted display, a sound outputting method, and a program each of which can enhance realistic feeling of an augmented reality space or a mixed reality space.

Solution to Problem

In order to solve the problem described above, a sound outputting apparatus according to the present invention includes an image generating section generating an image, of an augmented reality space or a mixed reality space, which includes a part which an image of a virtual reality space occupies and a part which an image of a real space obtained through photographing by a camera which photographs a circumference of a user occupies, and which is displayed on a display section of a head-mounted display, a synthetic sound generating section synthesizing a sound of the virtual reality space, and a sound of a real space of the circumference of the user with each other to generate a synthetic sound, and a sound outputting section outputting the synthetic sound sounded from a speaker arranged in a vicinity of an ear of the user.

In an aspect of the present invention, the synthetic sound generating section synthesizes the sound of the virtual reality space and the sound of the real space in a balance of a volume responding to a line of sight of the user to generate the synthetic sound.

In addition, in the aspect of the present invention, the synthetic sound generating section synthesizes the sound of the virtual reality space, and the sound of the real space in which a sound in a direction of a line of sight of the user is emphasized with each other to generate the synthetic sound.

In addition, in the aspect of the present invention, the sound of the virtual reality space is a sound which stored sound data or received sound stream represents.

In addition, a head-mounted display according to the present invention includes a camera section photographing a circumference of a user, a microphone section acquiring a sound of the circumference of the user, a display section displaying an image, of an augmented reality space or a mixed reality space, which includes a part which an image of a virtual reality space occupies and a part which an image of a real space obtained through photographing by the camera occupies, and a sound outputting section outputting a synthetic sound of a sound of the virtual reality space and a sound of a real space which the microphone acquires through a speaker arranged in a vicinity of an ear of the user.

In addition, a sound outputting method according to the present invention includes a step of generating an image, of an augmented reality space or a mixed reality space, which includes a part which an image of a virtual reality space occupies and a part which an image of a real space obtained through photographing by a camera which photographs a circumference of a user occupies, and which is displayed on a display section of a head-mounted display, a step of synthesizing a sound of the virtual reality space, and a sound of a real space of the circumference of the user with each other to generate a synthetic sound, and a step of outputting the synthetic sound sounded from a speaker arranged in a vicinity of an ear of the user.

In addition, a program according to the present invention causes a computer to execute a step of generating an image, of an augmented reality space or a mixed reality space, which includes a part which an image of a virtual reality space occupies and a part which an image of a real space obtained through photographing by a camera which photographs a circumference of a user occupies, and which is displayed on a display section of a head-mounted display, a step of synthesizing a sound of the virtual reality space, and a sound of a real space of the circumference of the user with each other to generate a synthetic sound, and a step of outputting the synthetic sound sounded from a speaker arranged in a vicinity of an ear of the user.

DESCRIPTION OF EMBODIMENTS

Hereinafter, an embodiment of the present invention will be described with reference to the drawings.

Figure 1:
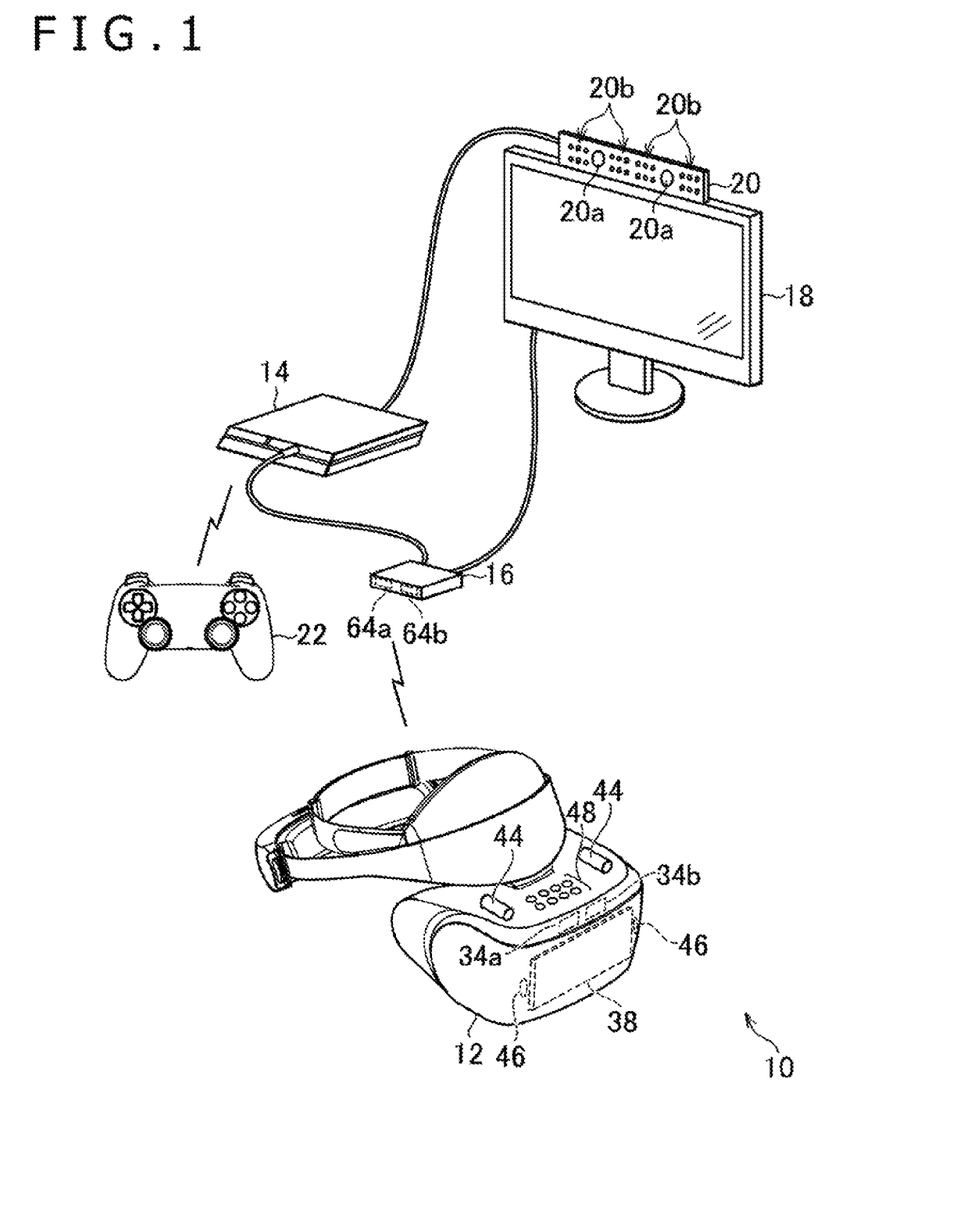
FIG. 1 is a view depicting an example of an entire configuration of an entertainment system according to an embodiment of the present invention.
Figure 2A:
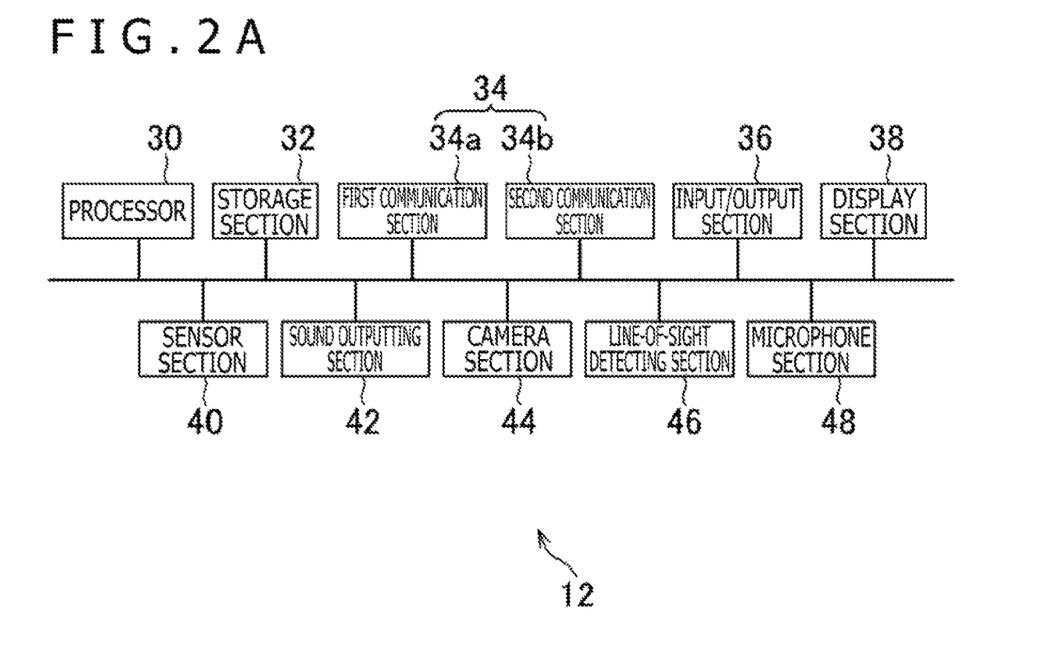
FIG. 2A is a block diagram depicting an example of a configuration of a head-mounted display according to the embodiment of the present invention.
Figure 2B:
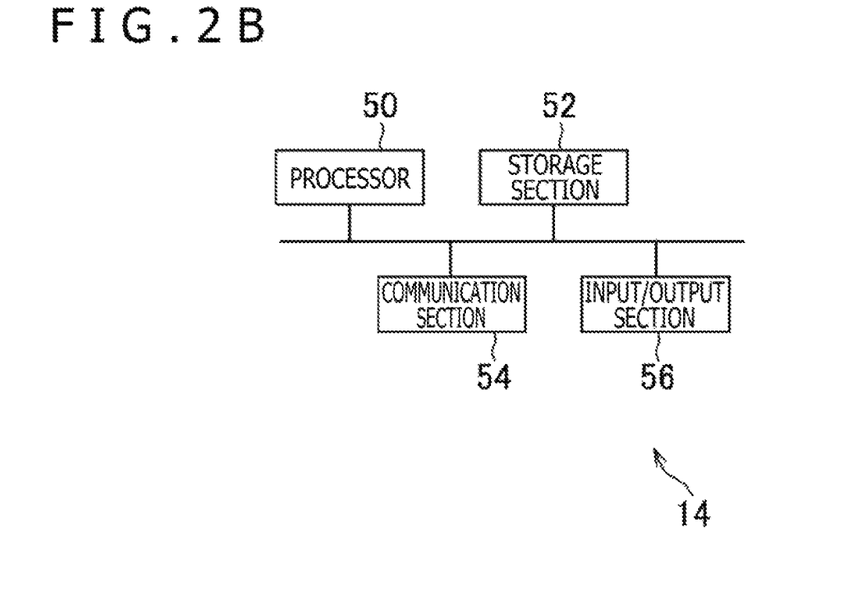
FIG. 2B is a block diagram depicting an example of a configuration of an entertainment apparatus according to the embodiment of the present invention.
Figure 2C:
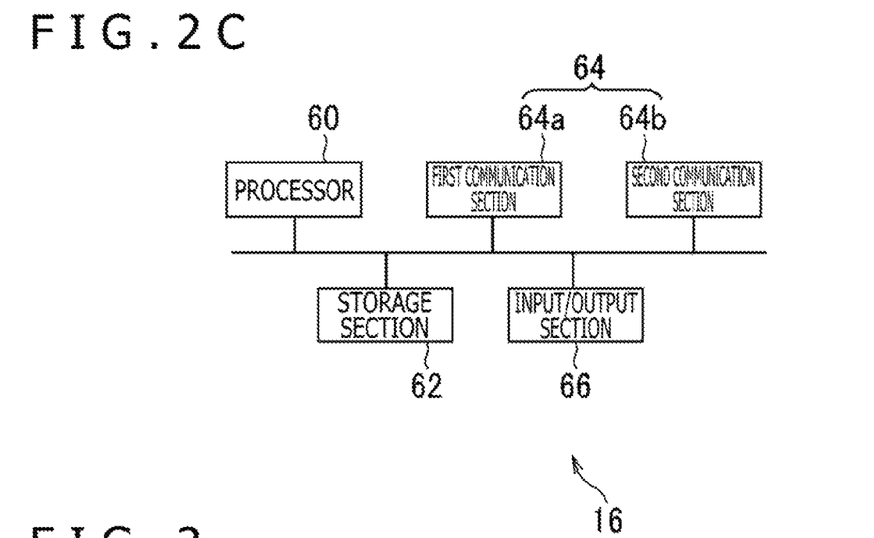
FIG. 2C is a block diagram depicting an example of a configuration of a relay apparatus according to the embodiment of the present invention.

FIG. 1 is a view depicting an example of an entire configuration of an entertainment system 10 according to an embodiment of the present invention. FIG. 2A is a block diagram depicting an example of a configuration of a head-mounted display (HMD) 12 according to the embodiment. FIG. 2B is a block diagram depicting an example of a configuration of an entertainment apparatus 14 according to the embodiment. FIG. 2C is a block diagram depicting an example of a configuration of a relay apparatus 16 according to the embodiment.

As depicted in FIG. 1, the entertainment system 10 according to the embodiment includes the HMD 12, the entertainment apparatus 14, the relay apparatus 16, a display 18, a camera microphone unit 20, and a controller 22.

The HMD 12 according to the embodiment, for example, as depicted in FIG. 2A, includes a processor 30, a storage section 32, a communication section 34, an input/output section 36, a display section 38, a sensor section 40, a sound outputting section 42, a camera section 44, a line-of-sight detecting section 46, and a microphone section 48. In addition, the communication section 34 includes a first communication section 34a and a second communication section 34b.

The processor 30, for example, is a program control device such as a microprocessor which operates in accordance with a program installed in the HMD 12. It should be noted that the HMD 12 may include a control circuit which can implement the processing which is to be executed by the processor 30 instead of including the processor 30.

The storage section 32, for example, is a storage element such as a read only memory (ROM) or a random access memory (RAM). A program which is to be executed by the processor 30, or the like is stored in the storage section 32.

Each of the first communication section 34a and the second communication section 34b, for example, is a communication interface such as a wireless local area network (LAN) module. In the embodiment, as depicted in FIG. 1, the first communication section 34a and the second communication section 34b are arranged in an upper front side of the HMD 12.

In the embodiment, a communication standard of the communication performed in the first communication section 34a, and a communication standard of the communication performed in the second communication section 34b are different from each other. For example, in the first communication section 34a, the communication in 60 GHz band is performed while in the second communication section 34b, the communication in 5 GHz band or 2.4 GHz band is performed.

The input/output section 36, for example, is an input/output port such as a high-definition multimedia interface (HDMI (registered trademark)) port, a universal serial bus (USB) port, or an AUX port.

The display section 38, for example, is a display such as a liquid crystal display or an organic electro-luminescence (EL) display which is arranged in the front side of the HMD 12, and displays a video image or the like generated by the entertainment apparatus 14. In addition, the display section 38 is accommodated in a chassis of the HMD 12. The display section 38 may receive a video image signal which the entertainment apparatus 14 outputs and which is relayed by the relay apparatus 16, and may output a video image represented by the video image signal of interest, for example. The display section 38 according to the embodiment, for example, displays an image for the left eye and an image for the right eye, thereby enabling a three-dimensional image to be displayed on the display section 38. Incidentally, it does not matter that the display section 38 may display only a two-dimensional image because it may be impossible for the display section 38 to display a three-dimensional image.

The sensor section 40, for example, is a sensor such as a motion sensor which can detect acceleration or angular velocity. The sensor section 40 outputs a detection result of an amount of rotation or an amount of movement in the HMD 12 at a predetermined sampling rate to the processor 30.

The sound outputting section 42, for example, is a speaker, such as a headphone or an earphone, which is arranged in the vicinity of the ear of the user, and outputs a sound or the like represented by the sound data generated by the entertainment apparatus 14. The sound outputting section 42, for example, receives the sound signal which the entertainment apparatus 14 outputs and which is relayed by the relay apparatus 16, and outputs the sound represented by the sound signal of interest.

The camera section 44, for example, is a camera such as a digital camera, and photographs a situation of a circumference of the user equipped with the HMD 12 at a predetermined frame rate. As depicted in FIG. 1, two camera sections 44 according to the embodiment are arranged on the upper side of the display section 38 so as to be able to photograph the front of the display section 38. For this reason, the camera section 44 according to the embodiment shall be able to photograph the front of the user equipped with the HMD 12. In addition, the camera section 44 according to the embodiment, for example, is a stereo camera provided with a lens for photographing an image for the left eye, and a lens for generating an image for the right eye.

The line-of-sight detecting section 46, for example, is a sensor which detects a line of sight of the user equipped with the HMD 12. The line-of-sight detecting section 46, for example, is arranged inside the chassis of the HMD 12. In addition, the line-of-sight detecting section 46 may include an infrared camera which detects a direction of the line of sight of the user equipped with the HMD 12.

The microphone section 48, for example, is a microphone which acquires a sound of the circumference, and transforms the sound into sound data to output the resulting sound data. In addition, the microphone section 48 may be provided with a function of outputting the sound data in which a sound in a specific direction is emphasized. For example, it does not matter that the microphone section 48 may be a microphone, such as an array microphone, which is variable in oriented direction. In addition, for example, the microphone section 48 may be a stereo microphone. Then, in this case, a program in accordance with which processing for processing the sound inputted to the stereo microphone to emphasize the sound in a specific direction can be executed may be stored in the storage section 32, and the program of interest may be executed by the processor 30.

The entertainment apparatus 14 according to the embodiment, for example, is a computer such as a game console, a digital versatile disc (DVD) player, or a Blu-ray (registered trademark) player. The entertainment apparatus 14 according to the embodiment, for example, generates a video image or a sound through the execution of the stored game program, the reproduction of the contents recorded in the optical disc, or the like. Then, the entertainment apparatus 14 according to the embodiment outputs the video image signal representing the generated video image, or the sound signal representing the generated sound to the HMD 12 or the display 18 through the relay apparatus 16.

The entertainment apparatus 14 according to the embodiment, for example, as depicted in FIG. 2B, includes a processor 50, a storage section 52, a communication section 54, and an input/output section 56.

The processor 50, for example, is a program control device, such as a central processing unit (CPU), which operates in accordance with a program installed in the entertainment apparatus 14. The processor 50 according to the embodiment also includes a graphics processing unit (GPU) which draws an image in a frame buffer on the basis of a graphics command or data supplied from a CPU. It should be noted that the entertainment apparatus 14 may include a control circuit which can implement the processing which is to be executed by the processor 50 instead of including the processor 50.

The storage section 52, for example, is a storage element such as a ROM or a RAM, a hard disc drive, or the like. A program or the like which is to be executed by the processor 50 is stored in the storage section 52. In addition, a region for a frame buffer in which an image is to be drawn by the GPU is secured in the storage section 52 according to the embodiment.

The communication section 54, for example, is a communication interface such as a wireless LAN module or the like.

The input/output section 56 is an input/output port such as an HDMI port or a USB port.

The relay apparatus 16 according to the embodiment is a computer which relays a video image signal or a sound signal outputted from the entertainment apparatus 14 to output the video image signal or the sound signal to the HMD 12 or the display 18.

The relay apparatus 16 according to the embodiment, for example, as depicted in FIG. 2C, includes a processor 60, a storage section 62, two communication sections 64 (a first communication section 64a and a second communication section 64b), and an input/output section 66.

The processor 60, for example, is a program control device, such as a CPU, which operates in accordance with a program installed in the relay apparatus 16. It should be noted that the relay apparatus 16 may include a control circuit which can implement the processing which is to be executed by the processor 60 instead of including the processor 60.

The storage section 62, for example, is a storage element such as a ROM or a RAM. A program or the like which is to be executed by the processor 60 is stored in the storage section 62.

Each of the first communication section 64a and the second communication section 64b, for example, is a communication interface such as a wireless LAN module. In the embodiment, as depicted in FIG. 1, a front side of the relay apparatus 16 includes the first communication section 64a and the second communication section 64b.

In the embodiment, a communication standard of the communication performed in the first communication section 64a, and a communication standard of the communication performed in the second communication section 64b are different from each other. For example, in the first communication section 64a, the communication in 60 GHz band is performed while in the second communication section 64b, the communication in 5 GHz band or 2.4 GHz band is performed.

The input/output section 66 is an input/output port such as an HDMI port or a USB port.

The display 18 according to the embodiment, for example, is a liquid crystal display or the like, and displays the video image represented by the video image signal outputted from the entertainment apparatus 14.

The camera microphone unit 20 according to the embodiment, for example, includes a camera 20a which outputs data representing a situation of a circumference of the camera microphone unit 20 such as an image obtained by photographing a subject to the entertainment apparatus 14. Furthermore, the camera 20a according to the embodiment is a stereo camera. In addition, the camera microphone unit 20 according to the embodiment includes a microphone 20b which acquires a sound of the circumference, and transforms the sound of interest into sound data to output the resulting sound data to the entertainment apparatus 14.

The HMD 12 and the relay apparatus 16, for example, can mutually perform transmission/reception of the data by the wireless communication. The entertainment apparatus 14 and the relay apparatus 16, for example, are connected to each other through an HDMI cable, a USB cable, or the like. The relay apparatus 16 and the display 18, for example, are connected to each other through an HDMI cable or the like. The entertainment apparatus 14 and the camera microphone unit 20, for example, are connected to each other through an AUX cable or the like.

The controller 22 according to the embodiment is a manipulation inputting apparatus which performs manipulation input to the entertainment apparatus 14. The user presses a direction key or a button with which the controller 22 is provided, or inclines a manipulation stick, thereby enabling various kinds of manipulation inputs to be performed by controlling the controller 22. Then, in the embodiment, the controller 22 outputs the input data associated with the manipulation input to the entertainment apparatus 14. In addition, the controller 22 according to the embodiment is provided with a USB port. Then, the controller 22 is connected to the entertainment apparatus 14 through the USB cable, thereby enabling the input data to be outputted to the entertainment apparatus 14 by wire. In addition, the controller 22 according to the embodiment is provided with a wireless communication module or the like, and thus is also adapted to output the input data to the entertainment apparatus 14 in a wireless manner.

In the embodiment, for example, the entertainment apparatus 14 executes a program such as a game program. Then, the entertainment apparatus 14 generates a video image of a three-dimensional virtual reality space responding to a situation of execution of the program or the like.

In addition, in the embodiment, a video image of a real space of a circumference of the user is photographed by the camera section 44.

Then, in the embodiment, a video image of an augmented reality space based on a video image of a virtual reality space generated by the entertainment apparatus 14, and a video image of a real space obtained through the photographing is displayed on the display section 38. It should be noted that although in the following, a description will be given with respect to an example in the case where the video image of the augmented reality space is displayed on the display section 38, it goes without saying that the embodiment can also be applied to the case where a video image of a mixed reality space (MR space) is displayed on the display section 38.

Hereinafter, the virtual reality space shall be referred to as the VR space, and the augmented reality space shall be referred to as the AR space. In addition, the video image, of the real space in which the user is present, which is photographed by the camera section 44 shall be referred to as the real space video image. In addition, a video image of the VR space generated by the entertainment apparatus 14 shall be referred to as the VR space video image. In addition, the video image of the AR space based on the real space video image and the VR space video image shall be referred to as the AR space video image.

Figure 3:
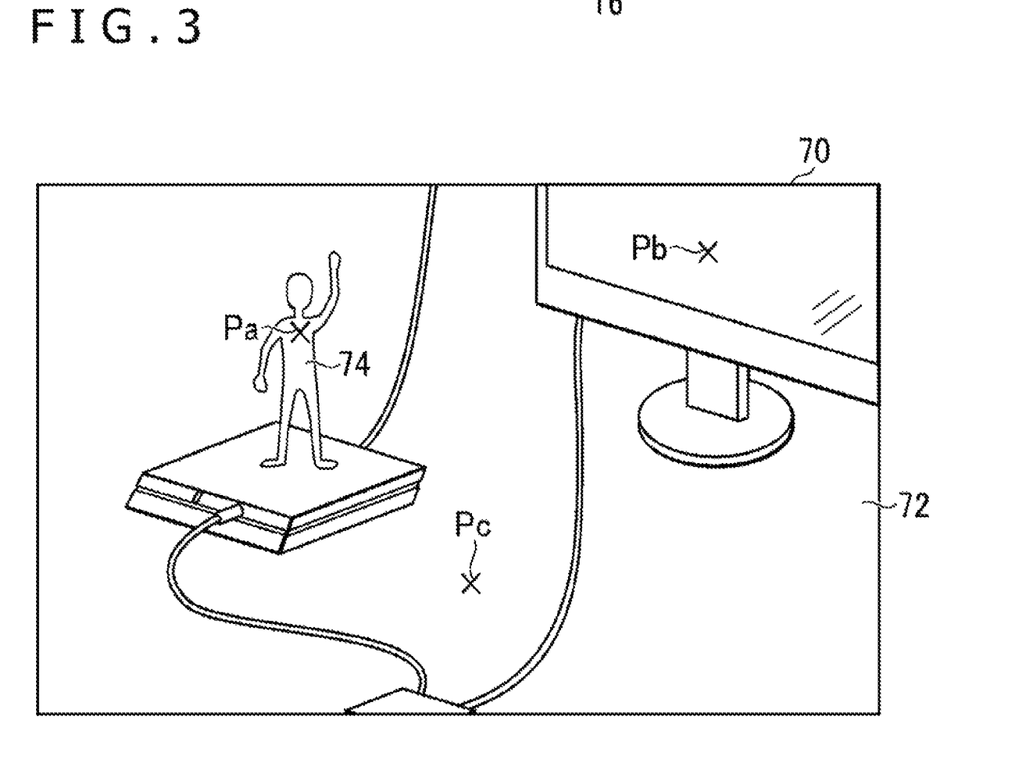
FIG. 3 is a view depicting an example of an augmented reality (AR) space image.

FIG. 3 is a view depicting an example of a frame image constituting the AR space video image displayed on the display section 38. Hereinafter, a frame image constituting the AR space video image and exemplified in FIG. 3 shall be referred to as an AR space image 70. As depicted in FIG. 3, the AR space image 70 includes a real space part 72 as a part which the frame image constituting the real space video image occupies, and a VR space part 74 as a part which the frame image constituting the VR space video image occupies. In the example of FIG. 3, an image of a virtual object arranged within the virtual reality space is depicted as the VR space part 74. Here, it does not matter that the AR space image 70 is an image obtained by superimposing the frame image constituting the VR space video image on the frame image constituting the real space video image.

Then, in the embodiment, a synthetic sound of the voice of the virtual reality space generated or reproduced by executing the program by the entertainment apparatus 14, and the sound of the real space of the circumference of the user equipped with the HMD 12 is sounded from the sound outputting section 42. Hereinafter, the sound of the virtual reality space generated or reproduced by executing the program shall be referred to as a VR space sound, and the sound of the real space of the circumference of the user equipped with the HMD 12 shall be referred to as a real space sound.

In such a manner, in the embodiment, the synthetic sound obtained by synthesizing the VR space sound and the real space sound is sounded from the sound outputting section 42. For this reason, the realistic feeling of the augmented reality space is enhanced as compared with the case where only the VR space sound is sounded from the sound outputting section 42 in a state in which the sound of the real space of the circumference of the user is intercepted.

Here, for example, the BGM, the sound effect, the sound about the virtual object such as the sound of the character, and the like are given as the VR space sound. In addition, the VR space sound may be a sound obtained by reproducing the sound data stored in the storage section 52, or the sound data recorded in the recording medium such as a DVD disc or a Blu-ray disc. In addition, the VR space sound may be the sound represented by the sound stream received through the Internet.

Then, in the embodiment, the synthetic sound obtained by synthesizing the VR space sound and the real space sound with each other in the balance of the volume responding to the line of sight of the user detected by the line-of-sight detecting section 46 is sounded from the sound outputting section 42. Here, for example, the balance between the volume of the VR space sound and the volume of the real space sound in the synthetic sound may be set in response to whether the line of sight of the user detected by the line-of-sight detecting section 46 faces the real space part 72 or the virtual space part 74.

Figure 4:
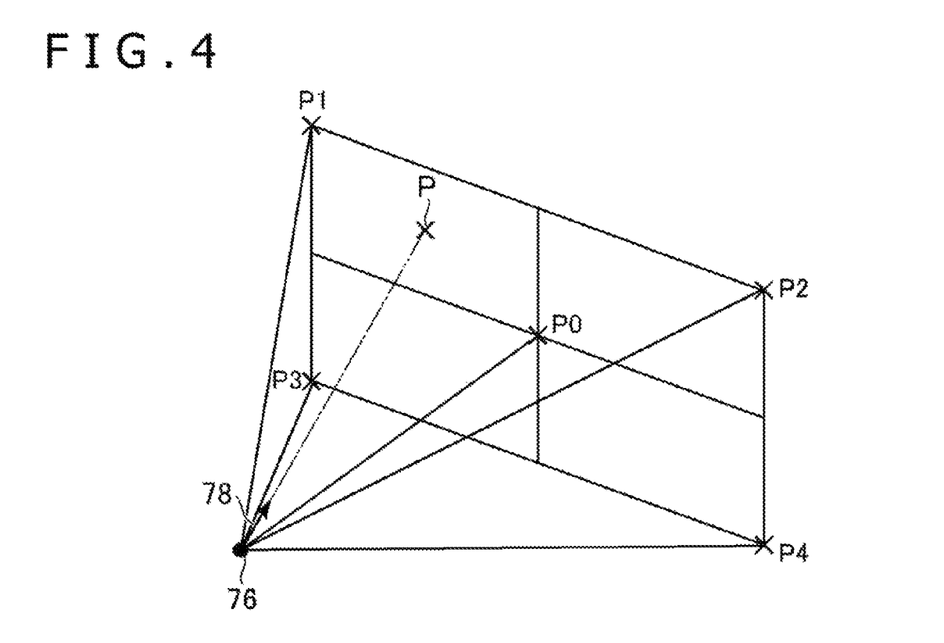
FIG. 4 is a view depicting an example of a point of gaze.

FIG. 4 is a view depicting an example of a point P of gaze associated with the line of sight of the user. In the embodiment, by using the known eye tracking technology, a line-of-sight direction 78 with a line 76 of sight of the user as a reference, and a position of a point P of gaze associated with the line-of-sight direction 78 shall be specified on the basis of the detection result of the line of sight by the line-of-sight detecting section 46. Then, in the embodiment, for example, the synthetic sound obtained by synthesizing the VR space sound and the real space sound with each other in the balance between the volumes responding to the position of the point P of gaze is sounded from the sound outputting section 42.

In FIG. 4, positions corresponding to a center, a top left corner, a top right corner, a lower left corner, and a lower right corner of the display section 38, respectively, are depicted as a position P0, a position P1, a position P2, a position P3, and a position P4, respectively. Then, in the embodiment, for example, when the user looks at the front, the position P0 is specified as the point P of gaze. Likewise, when the user looks at the top left corner, the top right corner, the lower left corner, or the lower right corner of the display section 38, the position P1, the position P2, the position P3, or the position P4 is specified as the point P of gaze, respectively.

Then, FIG. 3 depicts a point Pa of gaze, a point Pb of gaze, and a point Pc of gaze as examples of the specified points P of gaze.

Figure 5A:
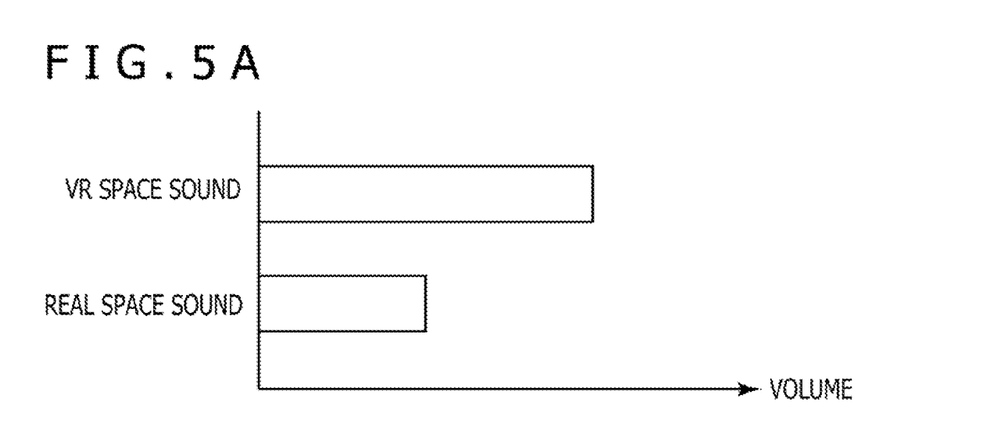
FIG. 5A is a graph depicting an example of a balance between a volume of a virtual reality (VR) space sound and a volume of a real space sound in a synthetic sound.

Here, in the example of FIG. 3, the position of the point Pa of gaze is present within the VR space part 74. In this case, as depicted in FIG. 5A, the synthetic sound in which the volume of the VR space sound is larger than the volume of the real space sound is generated and is sounded from the sound outputting section 42. In this case, for example, as depicted in FIG. 5A, the balance of the volume may be set in such a way that the volume of the VR space sound doubles the volume of the real space sound.

Figure 5B:
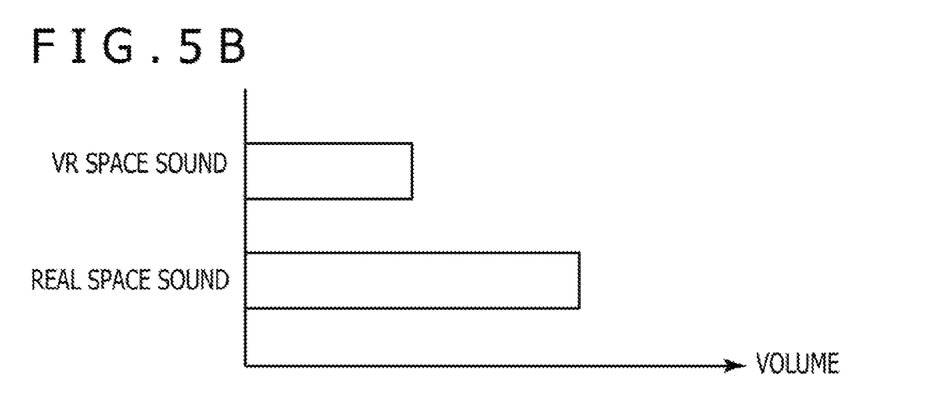
FIG. 5B is a graph depicting another example of the balance between the volume of the VR space sound and the volume of the real space sound in the synthetic sound.

On the other hand, the positions of the point Pb of gaze, and the point Pc of gaze are present within the real space part 72. In this case, as depicted in FIG. 5B, the synthetic sound in which the volume of the real space sound is larger than the volume of the VR space sound is generated and is sounded from the sound outputting section 42. In this case, for example, as depicted in FIG. 5B, the balance may be set in such a way that the volume of the real space sound doubles the volume of the VR space sound.

In the manner as described above, in the embodiment, the user changes the line of sight, thereby enabling the balance of volume between the VR space sound and the real space sound to be controlled. For example, the user changes the line of sight, whereby he/she can perform the control in such a way that the VR space sound is emphasized in the case where the gaze target of the user is the virtual object, and the real space sound is emphasized in the case where the gaze target of the user is the object within the real space.

In addition, with respect to the real space sound according to the embodiment, the sound in the direction responding to the position of the point P of gaze is emphasized. Here, for example, the sound in the line-of-sight direction 78 may be emphasized. In addition, for example, the sound in the direction in which a vector of the line-of-sight direction 78 is projected onto a horizontal surface may be emphasized.

Figure 6:
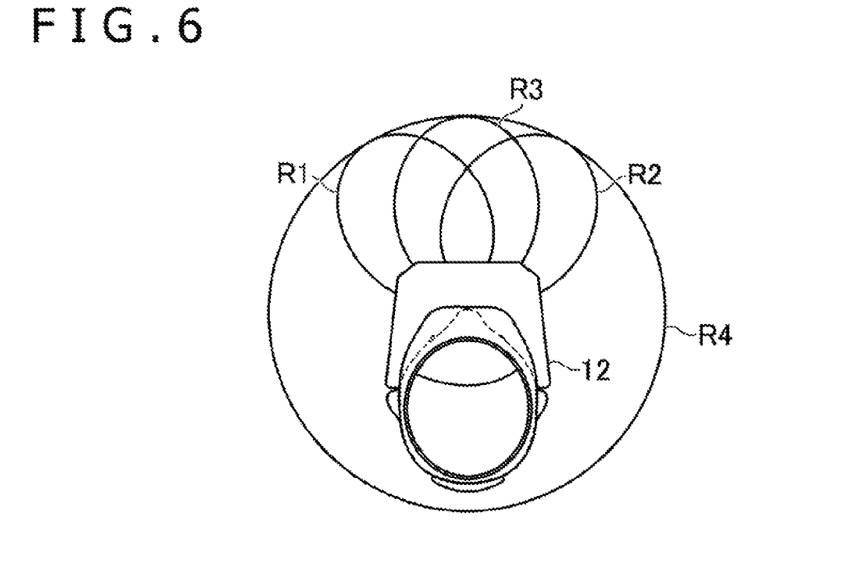
FIG. 6 is a view schematically depicting an example of a region within a real space emphasized in the real space sound.

FIG. 6 is a view schematically depicting an example of a region within the real space which is emphasized in the real space sound. In FIG. 6, there is drawn a situation in which the user equipped with the HMD 12 is viewed from above. Here, for example, in the case where the point P of gaze is located on the left side with respect to the front like the point Pa of gaze depicted in FIG. 3, as depicted in a region R1 of FIG. 6, a sound in a left front direction may be emphasized. In addition, for example, in the case where the point P of gaze is located on the right side with respect to the front like the point Pb of gaze depicted in FIG. 3, as depicted in a region R2 of FIG. 6, a sound in a right front direction may be emphasized. In addition, for example, in the case where the point P of gaze is located on the front side like the point Pc of gaze depicted in FIG. 3, as depicted in a region R3 of FIG. 6, a sound in a front direction may be emphasized.

In addition, for example, like the point Pa of gaze, in the case where the position of the point P of gaze is located within the VR space part 74, as depicting in a region R4 of FIG. 6, the volumes of the sounds in all directions in the real space sound may be equal to one another. That is, in this case, the real space sound may be non-directional.

In addition, for example, by using the known image recognizing technology, in the real space part 72, parts in which images of a plurality of objects arranged in the real space are indicated can be specified in some cases. In this case, when the position of the point P of gaze is present within a part in which an image of a specific object (for example, a wall, a ceiling, or the like) is indicated, as depicted in the region R4 of FIG. 6, the real space sound may be non-directional.

In the manner described above, in the embodiment, the user changes the line of sight, thereby enabling the oriented direction of the real space sound to be synthesized with the VR space sound to be controlled.

It should be noted that in the embodiment, the user performs the manipulation or the like of the controller 22, so that he/she may be able to set the entire volume of the sound outputted from the sound outputting section 42.

Hereinafter, functions of the HMD 12 and the entertainment apparatus 14 according to the embodiment, and processing executed in the HMD 12 and the entertainment apparatus 14 according to the embodiment will be further described.

Figure 7:
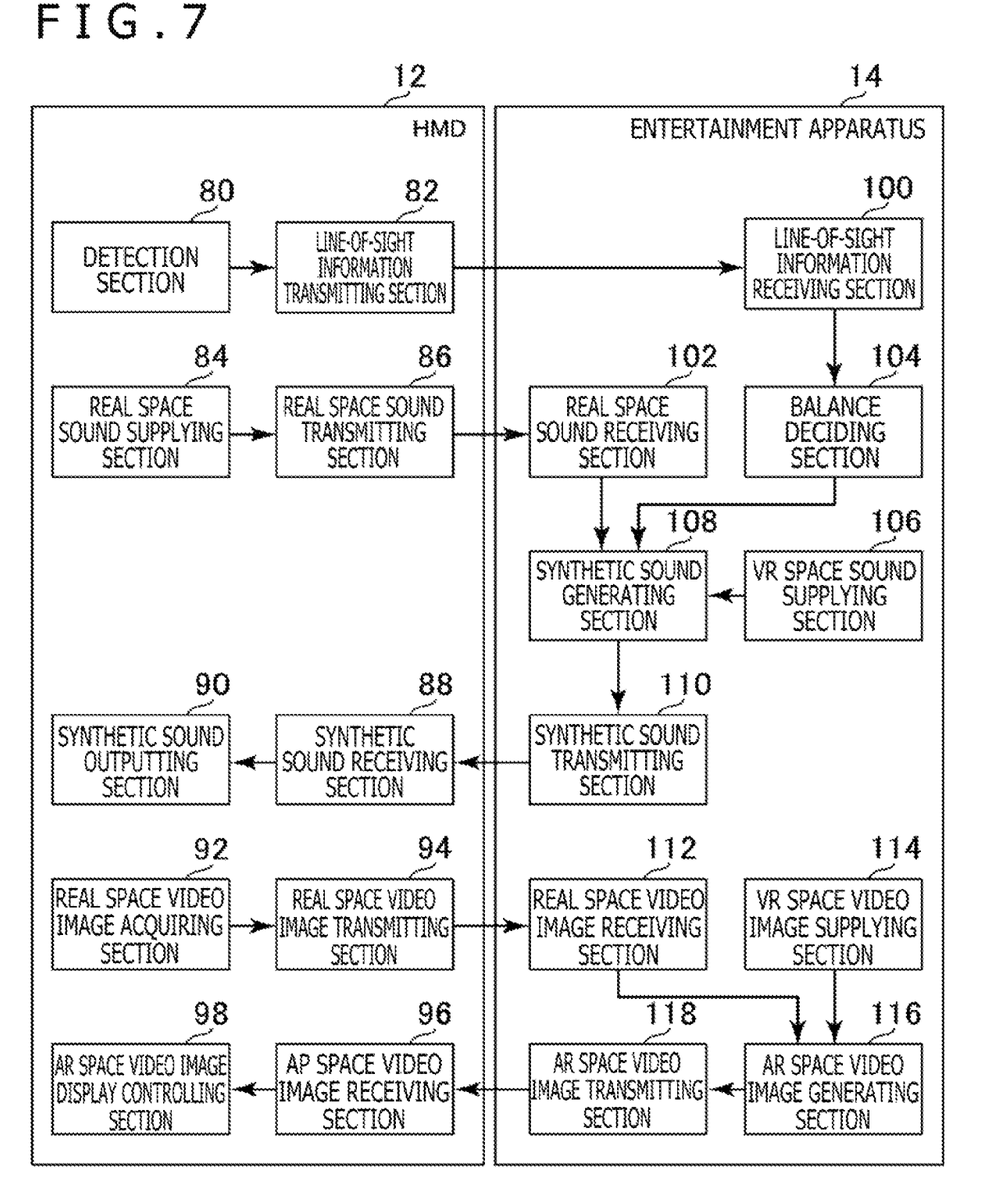
FIG. 7 is a functional block diagram depicting an example of a function mounted to the head-mounted display and the entertainment apparatus according to the embodiment of the present invention.

FIG. 7 is a functional block diagram depicting an example of the functions mounted to the HMD 12 and the entertainment apparatus 14 according to the embodiment. It should be noted that all the functions depicted in FIG. 7 need not to be mounted to the HMD 12 and the entertainment apparatus 14 according to the embodiment, and it does not matter that functions other than the functions depicted in FIG. 7 are mounted to the HMD 12 and the entertainment apparatus 14 according to the embodiment.

As depicted in FIG. 7, the HMD 12 according to the embodiment, in terms of the function, for example, includes a detection section 80, a line-of-sight information transmitting section 82, a real space sound supplying section 84, a real space sound transmitting section 86, a synthetic sound receiving section 88, a synthetic sound outputting section 90, a real space video image acquiring section 92, a real space video image transmitting section 94, an AR space video image receiving section 96, and an AR space video image display controlling section 98.

The detection section 80 is mainly mounted to the line-of-sight detecting section 46. The line-of-sight information transmitting section 82, the real space sound transmitting section 86, the synthetic sound receiving section 88, the real space video image transmitting section 94, and the AR space video image receiving section 96 are mainly mounted to the communication section 34. The real space sound supplying section 84 is mainly mounted to either the microphone section 48, or the processor 30 and the microphone section 48. The synthetic sound outputting section 90 is mainly mounted to the processor 30 and the sound outputting section 42. The real space video image acquiring section 92 is mainly mounted to the camera section 44. The AR space video image display controlling section 98 is mainly mounted to the processor 30 and the display section 38.

A program which is installed in the HMD 12 as the computer and which includes commands corresponding to the above functions may be executed by the processor 30 to mount the above functions. The program, for example, may be supplied to the HMD 12 through a computer-readable information storage medium such as an optical disc, a magnetic disc, a magnetic tape, a magneto-optical disc, or a flash memory, or through the Internet or the like.

In addition, as depicted in FIG. 7, the entertainment apparatus 14 according to the embodiment, in terms of the function, for example, includes a line-of-sight information receiving section 100, a real space sound receiving section 102, a balance deciding section 104, a VR space sound supplying section 106, a synthetic sound generating section 108, a synthetic sound transmitting section 110, a real space video image receiving section 112, a VR space video image supplying section 114, an AR space video image generating section 116, and an AR space video image transmitting section 118.

The line-of-sight information receiving section 100, the real space sound receiving section 102, a synthetic sound transmitting section 110, the real space video image receiving section 112, and the AR space video image transmitting section 118 are mainly mounted to the input/output section 56. The balance deciding section 104, the VR space sound supplying section 106, the synthetic sound generating section 108, the VR space video image supplying section 114, and the AR space video image generating section 116 are mainly mounted to the processor 50.

A program which is installed in the entertainment apparatus 14 as the computer and which includes commands corresponding to the above functions may be executed by the processor 50 to mount the above functions. The program, for example, may be supplied to the entertainment apparatus 14 through a computer-readable information storage medium such as an optical disc, a magnetic disc, a magnetic tape, a magneto-optical disc, or a flash memory, or through the Internet or the like.

The detection section 80, in the embodiment, for example, detects the line of sight of the user, and generates the line-of-sight information used in the decision of the balance of the synthetic sound on the basis of the detection result of the line of sight of interest. Here, the detection section 80, for example, may generate the information indicating the position of the point P of gaze within the AR space image 70, or the information indicating the vector of the line-of-sight direction 78 as the line-of-sight information. In addition, the detection section 80, for example, may generate the AR space image 70 on which a mark indicating the position of the point P of gaze is superimposed as the line-of-sight information.

The line-of-sight information transmitting section 82, in the embodiment, for example, transmits the line-of-sight information generated by the detection section 80 to the entertainment apparatus 14 via the relay apparatus 16.

The real space sound supplying section 84, in the embodiment, for example, supplies the real space sound described above to the real space sound transmitting section 86. Here, for example, the real space sound supplying section 84 may supply the directional sound in which the sound in a direction specified on the basis of the line-of-sight information generated by the detection section 80 in the manner as described above is emphasized to the real space sound transmitting section 86.

The real space sound transmitting section 86, in the embodiment, for example, transmits the real space sound supplied from the real space sound supplying section 84 to the entertainment apparatus 14 via the relay apparatus 16.

The synthetic sound receiving section 88, in the embodiment, for example, receives the synthetic sound obtained by synthesizing the VR space sound, and the real space sound. Here, the synthetic sound receiving section 88 may sound the synthetic sound from the speaker arranged in the vicinity of the ear of the user.

The synthetic sound outputting section 90, in the embodiment, for example, outputs the synthetic sound received by the synthetic sound receiving section 88.

The real space video image acquiring section 92, in the embodiment, for example, acquires the real space video image photographed by the camera section 44.

The real space video image transmitting section 94, in the embodiment, for example, transmits the real space video image acquired by the real space video image acquiring section 92 to the entertainment apparatus 14 via the relay apparatus 16.

The AR space video image receiving section 96, in the embodiment, for example, receives the AR space video image generated by the entertainment apparatus 14.

The AR space video image display controlling section 98, in the embodiment, for example, causes the AR space video image received by the AR space video image receiving section 96 to be displayed on the display section 38.

The line-of-sight information receiving section 100, in the embodiment, for example, receives the line-of-sight information transmitted by the line-of-sight information transmitting section 82.

The real space sound receiving section 102, in the embodiment, for example, receives the real space sound transmitted by the real space sound transmitting section 86.

The balance deciding section 104, in the embodiment, for example, decides the balance between the VR space sound and the real space sound in the synthetic sound on the basis of the line-of-sight information received by the line-of-sight information receiving section 100. Here, for example, in the case where it is specified that the position of the point P of gaze is located within the VR space part 74 on the basis of the line-of-sight information, as depicted in FIG. 5A, the balance may be decided in such a way that the volume of the VR space sound becomes larger than the volume of the real space sound. On the other hand, for example, in the case where it is specified that the position of the point P of gaze is located within the real space part 72 on the basis of the line-of-sight information, as depicted in FIG. 5B, the balance may be decided in such a way that the volume of the real space sound becomes larger than the volume of the VR space sound.

The VR space sound supplying section 106, in the embodiment, for example, supplies the VR space sound to the synthetic sound generating section 108. Here, as described above, the VR space sound, for example, may be the sound represented by either the stored sound data or the received sound stream.

The synthetic sound generating section 108, in the embodiment, for example, synthesizes the VR space sound and the real space sound with each other to generate the synthetic sound. The synthetic sound generating section 108 may synthesize the VR space sound supplied by the VR space sound supplying section 106, and the real space sound received by the real space sound receiving section 102 to generate the synthetic sound. In addition, the synthetic sound generating section 108 may synthesize the VR space sound and the real space sound in the balance of the volume responding to the line of sight of the user to generate the synthetic sound. In addition, the real space sound which is to be synthesized with the VR space sound may also be a sound in which the sound in the direction of the line of sight of the user is emphasized.

The synthetic sound transmitting section 110, in the embodiment, for example, transmits the synthetic sound generated by the synthetic sound generating section 108 to the HMD 12 via the relay apparatus 16. The synthetic sound transmitting section 110 according to the embodiment shall play a role as the sound outputting section which outputs the synthetic sound sounded from the speaker, such as a headphone or an earphone, which is arranged in the vicinity of the ear of the user.

The real space video image receiving section 112, in the embodiment, for example, receives the real space video image transmitted by the real space video image transmitting section 94.

The VR space video image supplying section 114, in the embodiment, for example, supplies the VR space video image to the AR space video image generating section 116.

The AR space video image generating section 116, in the embodiment, for example, generates the AR space video image on the basis of the real space video image received by the real space video image receiving section 112, and the VR space video image supplied by the VR space video image supplying section 114. As described above, the AR space image 70 as the frame image of the AR space video image may include the VR space part 74 occupied by the image of the VR space, and the real space part 72 occupied by the image of the real space photographed by the camera section 44 which photographs the circumference of the user.

The AR space video image transmitting section 118, in the embodiment, for example, transmits the AR space video image generated by the AR space video image generating section 116 to the HMD 12 via the relay apparatus 16.

Figure 8:
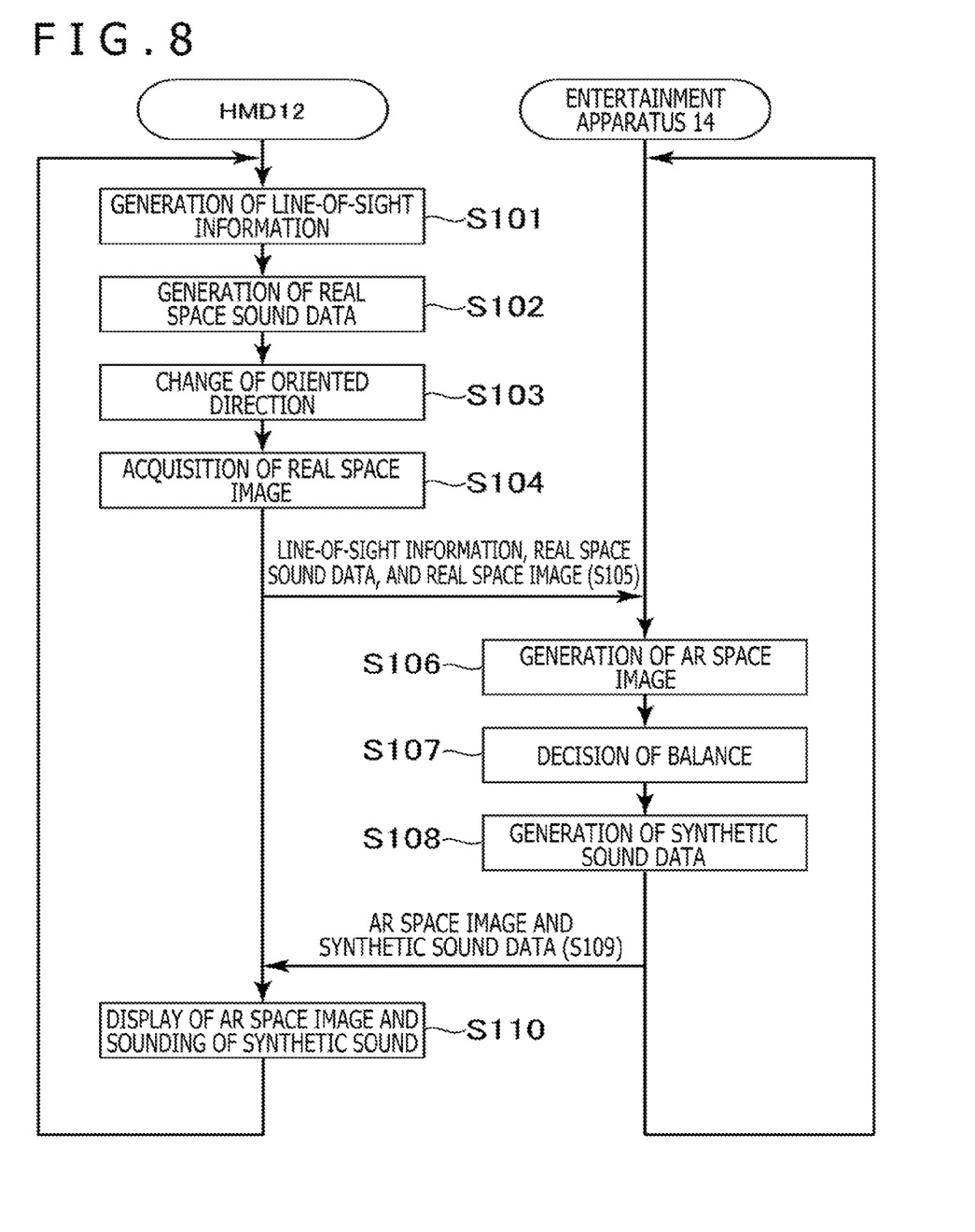
FIG. 8 is a flow chart depicting an example of flow of processing executed in the head-mounted display and the entertainment apparatus according to the embodiment of the present invention.

Hereinafter, an example of flow of processing executed in the HMD 12 and the entertainment apparatus 14 according to the embodiment will be described with reference to a flow chart exemplified in FIG. 8. It should be noted that in an example of the processing, the processing depicted in S101 to S110 depicted below is repetitively executed. It should be noted that the processing depicted in S101 to S110 depicted below may be repetitively executed at predetermined time intervals.

Firstly, the detection section 80 generates the line-of-sight information indicating the position of the point P of gaze within the AR space image 70 being displayed on the basis of the detected line of sight of the user (S101). In the processing depicted in S101, for example, the line-of-sight information in which the mark indicating the position of the point P of gaze is superimposed on the AR space image 70 being display may be generated.

Then, the real space sound supplying section 84 generates the real space sound data representing the real space sound (S102). In the processing depicted in S102, the real space sound data representing the real space sound from the timing of generation of the real space sound data in the last loop to the current time may be generated.

Then, the real space sound supplying section 84 changes the oriented direction of the microphone section 48 in such a way that the sound inputted from the direction associated with the line-of-sight information generated in the processing depicted in S101 is emphasized (S103). For this reason, in the example of the processing, the real space sound data representing the real space sound in which the sound inputted from the direction responding to the line-of-sight direction generated in the processing depicted in S101 is emphasized is generated in the processing depicted in S102 in a next loop.

Then, the real space video image acquiring section 92 acquires the frame image photographed by the camera section 44 (S104). Hereinafter, the frame image acquired in the processing depicted in S104 shall be referred to as the real space image.

Then, the HMD 12 transmits the line-of-sight information generated in the processing depicted in S101, the real space sound data generated in the processing depicted in S102, and the real space image acquired in the processing depicted in S104 to the entertainment apparatus 14. Here, in terms of the function, the line-of-sight information transmitting section 82 transmits the line-of-sight information, the real space sound transmitting section 86 transmits the real space sound data, and the real space video image transmitting section 94 transmits the real space image.

Then, the entertainment apparatus 14 receives these pieces of line-of-sight information, the real space sound data, and the real space image (S105).

Then, the AR space video image generating section 116 generates the AR space image 70 which includes the real space image received in the processing depicted in S105 as the real space part 72, and includes the image supplied by the VR space video image supplying section 114 as the VR space part 74 (S106).

Then, the balance deciding section 104 decides the balance between the VR space sound and the real space sound on the basis of the line-of-sight information received in the processing depicted in S105 (S107).

Then, the synthetic sound generating section 108 generates the synthetic sound data representing the synthetic sound obtained by synthesizing the VR space sound supplied by the VR space sound supplying section 106, and the sound represented by the real space sound data received in the processing depicted in S105 with each other (S108) in the balance decided in the processing depicted in S107.

Then, the entertainment apparatus 14 transmits the AR space image 70 generated in the processing depicted in S106, and the synthetic sound data generated in the processing depicted in S108 to the HMD 12. Here, in terms of the function, the synthetic sound transmitting section 110 transmits the synthetic sound data, and the AR space video image transmitting section 118 transmits the AR space image 70.

Then, the HMD 12 receives the pieces of synthetic sound data, and the AR space image 70 (S109).

Then, the AR space video image display controlling section 98 causes the AR space image 70 received in the processing depicted in S109 to be displayed on the display section 38, and the synthetic sound outputting section 90 sounds the synthetic sound represented by the synthetic sound data received in the processing depicted in S109 from the sound outputting section 42 (S110). Then, the processing is returned back to the processing depicted in S101.

Then, as described above, in the example of the processing, the processing depicted in S101 to S110 is repetitively executed at predetermined time intervals.

It should be noted that the method of generating the real space sound data is by no means limited to the method described above. For example, in the processing depicted in S102 described above, the real space sound supplying section 84 may execute the processing for emphasizing the sound inputted in the direction associated with the line-of-sight information generated in the processing depicted in the preceding S101 for the sound acquired by the microphone section 48. Then, the real space sound supplying section 84 may generate the real space sound data representing the sound for which the emphasizing processing is executed.

In addition, the method of deciding the balance between the volume of the VR space sound, and the volume of the real space sound is by no means limited to the method described above. For example, in the processing depicted in S107, the balance between the VR space sound and the real space sound in the synthetic sound may be decided on the basis of the AR space image 70 generated in the processing depicted in the preceding S106, and the line-of-sight information received in the processing depicted in S105 before S106. For example, the position of the point P of gaze associated with the line-of-sight information received in the processing depicted in S105 within the AR space image 70 generated in the processing depicted in S106 may be specified. Then, the balance between the VR space sound and the real space sound in the synthetic sound may be decided in response to whether the point P of gaze is present in the VR space part 74 or in the real space part 72.

In addition, for example, in the processing depicted in S109 described above, the entertainment apparatus 14 may transmit the stream data including the AR space image 70 generated in the processing depicted in S106, and the synthetic sound data generated in the processing depicted in S108 to the HMD 12. Then, the AR space video image display controlling section 98 may extract the AR space image 70 from the stream data received by the HMD 12. In addition, the synthetic sound outputting section 90 may extract the synthetic sound data from the stream data received by the HMD 12. Then, the AR space video image display controlling section 98 may cause the AR space image 70 extracted to be displayed on the display section 38, and the synthetic sound outputting section 90 may sound the synthetic sound represented by the extracted synthetic sound data from the sound outputting section 42.

It should be noted that the present invention is by no means limited to the embodiment described above.

For example, the synthetic sound obtained by muting the sound associated with a part other than the part including the point P of gaze may be generated. For example, in the case where the position of the point P of gaze is located within the VR space part 74, the synthetic sound obtained by muting the real space sound may be generated. In addition, for example, in the case where the position of the point P of gaze is located within the real space part 72, the synthetic sound obtained by muting the VR space sound may be generated.

In addition, for example, images of a plurality of virtual objects may be included as the VR space part 74 in the AR space image 70. Then, in the case where the point P of gaze is included in an image of a certain virtual object, the synthetic sound may be generated in which the volume of the sound associated with the virtual object of interest is larger than the volume of the sound associated with any other virtual object. Specifically, for example, in the case where the virtual object is a character, and the point P of gaze is included in an image of a certain character, the synthetic sound may be generated in which the volume of the voice of the character of interest is larger than the volume of the voice of any other character.

In addition, for example, it does not matter that the sound outputting section 42 is a headphone or an earphone which has a form different from that of the HMD 12.

In addition, for example, instead of using the sound acquired by the microphone section 48, the sound acquired by the microphone 20b may be used as the real space sound described above.

In addition, in FIG. 7, in the above description, it does not matter that a part of or all of the functions depicted as the functions of the entertainment apparatus 14 is mounted in the HMD 12 or in the relay apparatus 16. Specifically, for example, the HMD 12 may decide the balance between the VR space sound and the real space sound in the synthetic sound on the basis of the AR space image 70 displayed on the display section 38, and the line of sight of the user detected by the line-of-sight detecting section 46. Then, the HMD 12 may synthesize the VR space sound received from the entertainment apparatus 14, and the real space sound acquired by the microphone section 48 with each other to generate the synthetic sound.

In addition, as described above, the present invention can also be applied to the case where the video image of the mixed reality space (MR space) is displayed on the display section 38. The interaction between the environment of the virtual object arranged in the virtual reality space or the virtual reality space, and the environment of the object arranged in the real space or the real space becomes more important in the technology of the mixed reality as compared with in the technology of the augmented reality. For example, it is considered in the mixed reality space that the user views together with the character as the virtual object a program with the television set arranged in the real space, or the user converses with the character in a natural way. In addition, it is also considered in the mixed reality space that, for example, the character and the user play with each other by using the real space sound, or the user enjoys the reaction of the character to the real space sound.

Here, for example, in the case where the synthetic sound obtained by synthesizing the VR space sound and the real space sound in which the sound in the direction of the line of sight of the user is emphasized is generated, the VR space video image supplying section 114 may supply an image in which a virtual object facing an object which is present in the direction of the line of sight of the user is arranged. Then, the AR space video image generating section 116 may generate an image of the mixed space including the image of the virtual object such as the character facing the object, within the real space, which is present in the direction of the line of sight of the user as the VR space part 74. Then, the image of the mixed space generated in this manner may be transmitted to the HMD 12 and displayed on the display section 38.

In addition, or, the VR space sound supplying section 106 may supply a sound associated with an object, within the real space, which is present in the direction of the line of sight of the user. Specifically, for example, a sound may be supplied in which an object, within the real space, which is present in the direction of the line of sight of the user is set as a topic in a conversation. Then, the synthetic sound generating section 108 may synthesize a sound with the object within the real space as the topic in the conversation, and the real space sound with each other to generate the synthetic sound. Then, the synthetic sound generated in such a manner may be transmitted to the HMD 12 and may be outputted from the sound outputting section 42.

In addition, in this case, the AR space video image generating section 116 may generate an image, of the mixed space, including an image of a virtual object which has a conversation about an object, within the real space, which is present in the direction of the line of sight of the user as the VR space part 74. In addition, the AR space video image generating section 116 may generate an image, of the mixed space, including an image of a virtual object performing an operation responding to an object within the real space, which is present in the direction of the line of sight of the user as the VR space part 74.

For example, if the above constituents are adopted, then, the realistic feeling in the mixed reality space shall be enhanced. In the technology of the mixed reality, it is considered that the real space sound described above becomes an important one element constituting the environment of the real space. For this reason, in the technology of the mixed reality, it becomes more important to enhance the realistic feeling of the mixed reality space in the manner as described above.

In addition, the concrete character string or numerical values described above, and the concrete character string or numerical values in the drawings are an exemplification, and the present invention is by no means limited to these character strings or numerical values.

The invention claimed is:

1. A sound outputting apparatus, comprising:
    an image generating section generating an image, of an augmented reality space or a mixed reality space, which includes a part of an image that a virtual reality space occupies and a part which an image of a real space obtained through photographing by a camera which photographs a circumference that a user occupies, and which is displayed on a display section of a head-mounted display;
    a synthetic sound generating section synthesizing a sound of the virtual reality space, and a sound of a real space in the circumference of the user with respect to each other in a balance between a volume of the virtual reality space and the real space in response to whether a line of sight of the user faces the part of the image of the virtual reality space within the image of the augmented reality space or the mixed reality space occupies, or faces the part of the image that the real space occupies to generate a synthetic sound; and a sound outputting section outputting the synthetic sound sounded from a speaker arranged in a vicinity of an ear of the user, wherein the sound of the virtual reality space is a sound which is stored sound data or a received sound stream represents and includes a background music and a sound of a character in the virtual reality space controlled by the user.

2. The sound outputting apparatus according to claim 1, wherein the synthetic sound generating section synthesizes the sound of the virtual reality space, and the sound of the real space in which a sound in a direction of the line of sight of the user is emphasized with respect to each other to generate the synthetic sound.

3. A sound outputting method, comprising:

generating an image, of an augmented reality space or a mixed reality space, which includes a part of an image that a virtual reality space occupies and a part of an image that a real space obtained through photographing by a camera which photographs a circumference that a user occupies, and which is displayed on a display section of a head-mounted display;

synthesizing a sound of the virtual reality space, and a sound of a real space in the circumference of the user with respect to each other in a balance between a volume of the virtual space and the real space in response to whether a line of sight of the user faces the part of the image of the virtual reality space within the image of the augmented reality space or the mixed reality space occupies, or faces the part of the image that the real space occupies to generate a synthetic sound; and outputting the synthetic sound sounded from a speaker arranged in a vicinity of an ear of the user, wherein the sound of the virtual reality space is a sound which is stored sound data or a received sound stream represents and includes a background music and a sound of a character in the virtual reality space controlled by the user.

4. A non-transitory computer readable medium having stored thereon a program for a computer, the program comprising:

by an image generating section, generating an image, of an augmented reality space or a mixed reality space, which includes a part of an image that a virtual reality space occupies and a part which an image of a real space obtained through photographing by a camera which photographs a circumference that a user occupies, and which is displayed on a display section of a head-mounted display;

by a synthetic sound generating section, synthesizing a sound of the virtual reality space, and a sound of a real space in the circumference of the user with respect to each other in a balance between a volume of the virtual reality space and the real space in response to whether a line of sight of the user faces the part of the image of the virtual reality space within the image of the augmented reality space or the mixed reality space occupies, or faces the part of part of the image that the real space occupies to generate a synthetic sound; and by a sound outputting section, outputting the synthetic sound sounded from a speaker arranged in a vicinity of an ear of the user, wherein the sound of the virtual reality space is a sound which is stored sound data or a received sound stream represents and includes a background music and a sound of a character in the virtual reality space controlled by the user.

* * * * *